United States Patent [19]

Lessing

[11] Patent Number: 5,496,655

[45] Date of Patent: Mar. 5, 1996

[54] CATALYTIC BIPOLAR INTERCONNECTION PLATE FOR USE IN A FUEL CELL

[75] Inventor: Paul A. Lessing, Idaho Falls, Id.

[73] Assignee: Lockheed Idaho Technologies Company, Idaho Falls, Id.

[21] Appl. No.: 322,660

[22] Filed: Oct. 12, 1994

[51] Int. Cl.$^6$ ........................................ H01M 8/02
[52] U.S. Cl. .................. 429/34; 429/26; 429/30; 429/38; 429/39; 429/40; 429/44
[58] Field of Search ........................ 429/26, 30, 34, 429/38, 39, 40, 44; 29/623.1

[56] References Cited

U.S. PATENT DOCUMENTS

| | | | |
|---|---|---|---|
| 4,522,894 | 6/1985 | Hwang et al. | 429/17 |
| 4,555,453 | 11/1985 | Appleby | 429/41 |
| 4,567,117 | 1/1986 | Patel et al. | 429/19 |
| 4,629,537 | 12/1986 | Hsu | 204/15 |
| 4,721,556 | 1/1988 | Hsu | 204/258 |
| 4,902,587 | 2/1990 | Saitoh et al. | 429/45 |
| 4,950,562 | 8/1990 | Yoshida et al. | 429/32 |
| 4,997,727 | 3/1991 | Bossel | 429/33 |
| 5,034,288 | 7/1991 | Bossel | 429/32 |
| 5,069,987 | 12/1991 | Gordon | 429/31 |
| 5,110,692 | 5/1992 | Farooque et al. | 429/36 |
| 5,208,115 | 5/1993 | Akapi | 429/26 |

FOREIGN PATENT DOCUMENTS

60-76836  8/1994  Japan.

*Primary Examiner*—Prince Willis, Jr.
*Assistant Examiner*—M. Nuzzolillo
*Attorney, Agent, or Firm*—Klaas Law O'Meara & Malkin

[57] ABSTRACT

A bipolar interconnection plate for use between adjacent fuel cell units in a stacked fuel cell assembly. Each plate is manufactured from an intermetallic composition, examples of which include NiAl or $Ni_3Al$ which can catalyze steam reforming of hydrocarbons. Distributed within the intermetallic structure of the plate is a ceramic filler composition. The plate includes a first side with gas flow channels therein and a second side with fuel flow channels therein. A protective coating is applied to the first side, with exemplary coatings including strontium-doped or calcium-doped lanthanum chromite. To produce the plate, Ni and Al powders are combined with the filler composition, compressed at a pressure of about 10,000–30,000 psi, and heated to about 600°–1000° C. The coating is then applied to the first side of the completed plate using liquid injection plasma deposition or other deposition techniques.

29 Claims, 3 Drawing Sheets

CATALYTIC BIPOLAR INTERCONNECTION PLATE FOR USE IN A FUEL CELL

CONTRACTUAL ORIGIN OF THE INVENTION

The United States Government has rights in this invention disclosed under Contract No. DE-AC07-76ID01570 between the United States Department of Energy and EG&G Idaho, Inc., now Contract No. DE-AC07-94ID3223 between the United States Department of Energy and Lockheed Idaho Technologies Company.

BACKGROUND OF THE INVENTION

The present invention generally relates to multi-component fuel cell power generation systems, and more particularly to a fuel cell system which uses a bipolar interconnection plate between adjacent fuel cell units which is characterized by a high degree of catalytic activity, increased durability, enhanced electrical performance, and other benefits.

Fuel cell systems are known and used for the direct production of electricity from standard fuel materials including fossil fuels, hydrogen, and the like. Fuel cells typically include a porous anode, a porous cathode, and a solid or liquid electrolyte therebetween. Fuel materials are directed along and in contact with the anode of the fuel cell system, while an oxidizing gas (e.g. air or $O_2$) is allowed to pass along and in contact with the cathode of the system. As a result, the fuel is oxidized, with the oxidizing gas being reduced in order to generate electricity. The electrolyte is designed to allow charge transfer between the anode and cathode. Basic aspects of fuel cell technology including the concepts described above are well known in the art and generally discussed in U.S. Pat. Nos. 4,522,894 to Hwang et al.; 4,555,453 to Appleby; 4,567,117 to Patel et al.; 4,629,537 to Hsu; 4,721,556 to Hsu; 4,950,562 to Yoshida et al.; 4,997,727 to Bossel; 5,034,288 to Bossel; 5,069,987 to Gordon; and 5,110,692 to Farooque et al.

In order to produce fuel cell systems with a high degree of electrical output, stacked arrangements of multiple fuel cell units have been developed. To achieve electrical continuity in stacked systems and in order to separate adjacent fuel cell units, a structure known as a "bipolar interconnection plate" is provided between each fuel cell unit in the stack. Specifically, each bipolar plate in the fuel cell stack is positioned against and in contact with the cathode of one fuel cell unit in the stack and the anode of the next successive fuel cell unit in the stack. As a result, one side of the bipolar plate is positioned against the cathode of one fuel cell unit, while the other side of the bipolar plate is positioned against the anode of another fuel cell unit. The bipolar plates in a stacked fuel cell system are important components which must provide a high degree of electrical conductivity with a sufficient level of thermal shock resistance to ensure efficient operation of the fuel cell system. In addition, each of the selected bipolar plates must have a structure and composition which facilitates the secure attachment thereof to adjacent structures in the fuel cell stack.

Numerous bipolar plate structures have been developed for use in stacked fuel cell systems which incorporate a variety of different materials and designs. For example, U.S. Pat. No. 4,997,727 to Bossel discloses a stacked fuel cell system which uses a plurality of bipolar plate units, with each plate being constructed of a complex nickel alloy containing 15.0% by weight Cr; 2.5% by weight Ti; 0.7% by weight Al; 1.0% by weight Nb; 7.0% by weight Fe; 0.4% by weight Si; 0.5% by weight Mn; and 0.04% by weight C, with the remainder consisting of Ni. U.S. Pat. Nos. 4,629,537 and 4,721,556 to Hsu both disclose electrochemical converter/fuel cell units which use bipolar interconnection plates that are each manufactured from silicon carbide, a selected nickel alloy (e.g. of substantially the same type described above in U.S. Pat. No. 4,997,727 to Bossel), or a platinum alloy. U.S. Pat. No. 4,555,453 to Appleby involves a molten carbonate fuel cell system which uses a plurality of stacked fuel cell units, each being separated by a bipolar plate manufactured from nickel-clad stainless steel.

Other bipolar interconnecting structures are disclosed in U.S. Pat. No. 5,034,288 to Bossel which are manufactured from silicon carbide; an alloy consisting of 80% by weight Ni, 14% by weight Cr, and 6% by weight Fe coated on the oxygen side with a layer of La/Mn perovskite; or an alloy containing the following metals in various amounts: Cr, Al, Ti, Zr, Mn, Si, B, C, and Ni. This alloy is likewise coated on the oxygen side with a layer of $SnO_2$ doped with $Sb_2O_3$ or La/Mn perovskite. U.S. Pat. No. 5,069,987 to Gordon discusses the use of $LaCr_{0.9}Mg_{0.1}O_3$ to manufacture bipolar plates in fuel cell systems. Finally, U.S. Pat. No. 4,950,562 to Yoshida et al. discusses a fuel cell system using bipolar interconnecting plates constructed of a heat-resistant alloy material containing cobalt, chromium, nickel, iron, or manganese coated with a composite oxide of the perovskite variety.

Notwithstanding the foregoing developments, stacked fuel cell systems have yet to become commercially viable to a significant degree due to a variety of technical problems including high-cost fabrication methods, a lack of shock resistance (which causes cracking and sealing problems), and high levels of internal resistance. Thus, a need remains for a specialized bipolar plate structure suitable for use in stacked fuel cell systems which avoids these problems. In particular, a need exists for a bipolar interconnection plate which offers the benefits of (1) increased thermal shock resistance; (2) lower processing costs; and (3) increased electrical performance due to higher conductivity levels. As described in greater detail below, the present invention involves a unique bipolar plate structure which satisfies these needs and offers other substantial benefits including but not limited to internal catalytic capabilities which enhance the overall efficiency of the fuel cell stack. In addition, the bipolar plate structure described herein provides beneficial thermal expansion characteristics which enable the completed structure to have a coefficient of thermal expansion which is highly compatible with other components in the fuel cell stack. Thus, the present invention represents an advance in the art of fuel cell design as described in greater detail below.

SUMMARY OF THE INVENTION

It is an object of the present invention to provide an improved bipolar interconnection plate for a stacked fuel cell system.

It is another object of the invention to provide a bipolar interconnection plate for a stacked fuel cell system which is characterized by increased shock resistance and electrical conductivity.

It is another object of the invention to provide a bipolar interconnection plate for a stacked fuel cell system which is readily manufactured in an economical and highly efficient manner.

It is another object of the invention to provide a bipolar interconnection plate for a stacked fuel cell system which is manufactured from a composition having a substantial degree of catalytic activity regarding the steam reformation of hydrocarbon fuels into hydrogen, carbon monoxide, and carbon dioxide.

It is further object of the invention to provide a bipolar interconnection plate for a stacked fuel cell system which is produced from a non-alloy, intermetallic compound in combination with a ceramic filler composition in order to produce a highly porous structure which is characterized by an absence of warping and structural deformation, increased internal surface area, and reduced weight.

It is a still further object of the invention to provide a bipolar interconnection plate for a stacked fuel cell system which has thermal expansion characteristics that are comparable to those of the other components in the fuel cell system.

It is an even further object of the invention to provide a stacked fuel cell system which incorporates bipolar interconnection plates of the type described herein so that the foregoing benefits may be achieved.

In accordance with the objects listed above, an improved bipolar interconnection plate structure for use in a stacked fuel cell system is disclosed herein. The bipolar interconnection plate of the present invention is designed for placement between individual fuel cell units in a stacked, multiple fuel cell power generation system, with each fuel cell unit comprising an anode member, a cathode member, and a portion of electrolyte material between the anode and cathode members. Specific components, materials, parameters, and construction techniques associated with the anode member, cathode member, and electrolyte material will be described below.

Each bipolar interconnection plate produced in accordance with the invention consists of a planar member comprising a first side and a second side. In a preferred embodiment, the first side includes a plurality of elongate gas flow channels designed to receive a supply of an oxidizing gas therein (e.g. air or $O_2$), with the second side including a plurality of elongate fuel flow channels. All of the gas flow channels are preferably parallel to each other and extend longitudinally along the bipolar plate in a first direction. Likewise, all of the fuel flow channels are optimally parallel to each other and extend longitudinally along the bipolar plate in a second direction perpendicular to the first direction.

The bipolar interconnection plate described herein is constructed of a selected intermetallic compound which is significantly different from a metal alloy in numerous respects. Specifically, an intermetallic compound involves a chemical compound of fixed structure and atomic composition. In particular, intermetallic compounds typically consist of two types of metal atoms (e.g. A and B) which are combined in a fixed ratio (e.g. AB, $A_3B$, $AB_3$, and the like) with a very narrow variation in these ratios. Intermetallic compounds have distinct mechanical and physical properties that are different from metal A, metal B, or solid solutions (alloys) of B atoms mixed into metal A or A atoms mixed into metal B. For example, intermetallic compounds have very distinctive melting points and crystalline structures compared with alloys involving a mixture of metal A and metal B atoms. Metal alloys specifically involve a combination of two or more atoms in a wide range of compositions which retain the same basic crystalline structure associated with the majority (predominant) atom. This is not the case with intermetallic compounds in which metal atoms are combined in fixed ratios. Accordingly, metal alloys and intermetallic compounds are significantly different, with such differences being well known to individuals skilled in the metallurgical arts. In a preferred embodiment, the intermetallic compound in the present invention will be selected from the group consisting of NiAl and $Ni_3Al$.

The bipolar interconnection plate will also include at least one ceramic filler composition randomly dispersed therein. Exemplary ceramic filler compositions include alumina, zirconia, calcium zirconium phosphate, strontium zirconium phosphate, zirconium silicate, mullite, and cordierite. However, the present invention shall not be limited exclusively to the foregoing materials which are provided for example purposes only. The completed bipolar interconnection plate will optimally include about 40–80% by weight intermetallic compound and about 20–60% by weight ceramic filler composition. In addition, the completed plate structure will also preferably include an electrically conductive protective coating on the first side thereof. Preferred compositions suitable for this purpose are selected from the group consisting of strontium-doped lanthanum chromite ($La_{1-x}Sr_xCrO_3$; x=0.1–0.4), calcium-doped lanthanum chromite ($L_{1-x}Ca_xCrO_3$; x=0.1–0.4), strontium-doped lanthanum cobaltite ($La_{1-x}Sr_xCrO_3$; x=0.1–0.4), calcium-doped lanthanum cobaltite ($La_{1-x}Ca_xCoO_3$; x=0.1–0.4), strontium-doped gadolinium cobaltite ($Gd_{1-x}Sr_xCoO_3$; x=0.1–0.4), calcium-doped gadolinium cobaltite ($Gd_{1-x}Ca_xCoO_3$; x=0.1–0.4), strontium-doped yttrium chromite ($Y_{1-x}Sr_xCrO_3$; x=0.1–0.6), calcium-doped yttrium chromite ($Y_{1-x}Ca_xCrO_3$; x=0.1–0.6), strontium-doped neodymium chromite ($Nd_{1-x}Sr_xCrO_3$; x=0.1–0.4), calcium-doped neodymium chromite ($Nd_{1-x}Ca_xCrO_3$; x=0.1–0.4), strontium-doped yttrium ferrite ($Y_{1-x}Sr_xFeO_3$; x=0.1–0.4), and calcium-doped yttrium ferrite ($Y_{1-x}Ca_xFeO_3$; x=0.1–0.4). The protective coating is designed to prevent oxidation of the plate structure. In addition, the protective coating also prevents fuel gases ($H_2$ and CO) from migrating into the plate via the gas flow channels and burning (combusting) without participating in the basic fuel cell reaction processes.

In order to produce the foregoing bipolar interconnection plate, elemental Ni powder, elemental Al powder, and at least one powdered ceramic filler composition (hereinafter "ceramic filler powder") of the type listed above are combined to form a mixture. If the bipolar plate is to be constructed from intermetallic NiAl, the elemental Ni powder and elemental Al powder will be combined in an Al:Ni molar ratio of about 1:1 to form a mixed metal product containing equimolar amounts of Ni and Al. However, if the bipolar plate is to be manufactured from $Ni_3Al$, the elemental Al powder and elemental Ni powder will be combined in an Al:Ni molar ratio of about 1:3 to form a mixed metal product containing three moles of Ni for each mole of Al. Regarding the amount of ceramic filler powder to be used, it is preferred that the ceramic filler powder be added to the Ni-Al mixed metal product in a ceramic filler powder: Ni-Al mixed metal product volume ratio of about 1:0.43 to 1:2.33. In this regard, each gram of ceramic filler powder will be combined with about 0.56–3.1 grams of the mixed metal product containing Ni and Al therein. The foregoing quantitative information regarding the ceramic filler powder shall be applicable whether the Al:Ni molar ratio is 1:1 or 1:3. In accordance with the abovedescribed parameters, the completed mixture of elemental Al, elemental Ni, and ceramic filler powder will contain about 25.0–65.0% by weight ceramic filler powder, about 11.0–23.6% by weight elemental Al, and about 24.0–51.4% by weight elemental Ni.

The mixture including the ceramic filler powder, elemental Ni, and elemental Al is thereafter placed in a mold which is structurally configured to produce a completed product having the desired size, dimensional characteristics, and fuel/gas flow channels therein. The present invention shall not be limited to the use of any particular type of molding apparatus, provided that the selected apparatus is capable of compressing the mixture therein as described below. The mixture within the mold is then compressed through the application of uniaxial pressure at an optimum pressure level of about 10,000–30,000 psi, followed by isostatic pressing within the mold. Thereafter, the mold and compressed mixture within the mold are placed in a heating apparatus (e.g. a furnace) and heated at temperature of about 600°–1000° C. At this temperature level, solid state combustion synthesis takes place which is accompanied by the evolution of substantial amounts of heat. The completed plate structure is then removed from the mold.

Heating and compressing of the mixture in the foregoing manner creates a bipolar interconnection plate having the desired dimensional characteristics and channels therein. In addition, the completed plate is substantially planar in character without warpage and other disfiguring characteristics. From a structural standpoint, the completed plate consists of either intermetallic NiAl or $Ni_3Al$ (depending on the molar ratio of Al and Ni to each other), with the ceramic filler powder being randomly dispersed therein. The use of intermetallic materials in the foregoing manner offers numerous benefits compared with metallic alloys. These benefits include but are not limited to the capability to operate at higher temperatures, higher oxidation resistance, lower material costs, lower fabrication costs, higher catalytic activity, and lower weight. The randomly distributed ceramic filler composition/powder likewise provides numerous benefits including but not limited to: (1) the absorbing of heat during the production process so that warpage and other structural disfiguration of the plate is prevented; (2) a lowering of the overall coefficient of thermal expansion (hereinafter "CTE") of the entire plate structure so that it will more precisely conform with the thermal expansion characteristics of other components in the fuel cell system; and (3) an increase in the porosity of the plate structure in order to reduce the weight of the structure and provide more internal surface area therein. Increased internal surface area (which results from use of the ceramic filler composition and intermetallic materials instead of alloys) is of considerable importance. Specifically, it is a feature of the present invention that the NiAl and $Ni_3Al$ intermetallic materials described above are catalytic in character regarding the steam reforming of hydrocarbon fuels (e.g. diesel fuel and/or methane) into hydrogen, carbon dioxide, and carbon monoxide. This internal catalytic activity greatly increases the overall efficiency of the entire fuel cell system. Furthermore, increased surface area within the bipolar plate as described above substantially increases the extent of catalytic activity which can occur within the plate in connection with the intermetallic NiAl or $Ni_3Al$.

Finally, the first side of the completed bipolar plate having the gas flow channels therein is covered with a protective coating for the purposes described above. Exemplary protective coating materials are listed above. To apply the protective coating, many different conventional techniques may be used including but not limited to atmospheric pressure plasma spraying, reactive sputtering, chemical vapor deposition, and reduced pressure plasma spraying. Another technique which can be used involves a unique procedure called "liquid injection plasma deposition". As described in greater detail below, this procedure basically involves the steps of (1) dissolving salts (e.g. nitrates) containing selected metals in water or alcohol to form a solution, with the selected metals corresponding to the metals in the compositions to be deposited; (2) using hydrostatic pressure to inject the solution into a hot plasma typically generated by a direct current (DC) arc or radio frequency (RF) device operating using a carrier gas consisting of argon, helium, hydrogen or other comparable gases; (3) allowing the dissolved metal salt materials within the solution to decompose into particles and vapor containing mixed cation oxides; and (4) impinging the vapor and particles onto the desired surface to be coated, with the surface being maintained at 1 atm pressure or a partial vacuum.

The bipolar plate structures described herein are uniquely constructed from an unusual combination of materials which provide numerous benefits as listed above. Each bipolar plate structure is fixedly positioned between two of the individual fuel cell units within the fuel cell stack, with each individual fuel cell unit comprising an anode member, a cathode member, and a portion of electrolyte material between the anode and cathode members. In particular, the first side of each bipolar plate having the gas flow channels therein is placed in physical contact with the cathode member in one of the fuel cell units within the stack. The second side of the bipolar plate having the fuel flow channels therein is placed in physical contact with the anode in the next successive fuel cell unit in the stack. As a result, each of the fuel cell units within the stack is separated by one of the bipolar interconnection plates. It should be noted that the present invention shall not be limited regarding the particular materials used to construct the components of the fuel cell units in the stack (e.g. the anodes, cathodes, and electrolyte material), and likewise shall not be limited to any particular dimensional characteristics or heating/compression systems used to produce the completed bipolar plate. Representative methods, materials, structures, and components associated with fuel cell units and power generation systems suitable for use in connection with the bipolar plates of the present invention will be provided below.

These and other objects, features, and advantages of the invention shall be described below in the following Brief Description of the Drawings and Detailed Description of Preferred Embodiments.

DETAILED DESCRIPTION OF PREFERRED EMBODIMENTS

The present invention involves a specialized and unique bipolar interconnection plate for use between adjacent fuel cell units in a stacked, multiple fuel cell power generation system. As previously indicated, fuel cell technology generally involves the direct production of electricity from standard fuel materials, including fossil fuels (e.g. diesel fuel/methane), hydrogen, and the like. Fuel cells typically include a porous anode, a porous cathode, and a solid or liquid electrolyte therebetween. Fuel materials are directed along and in contact with the anode of the fuel cell system, while an oxidizing gas (e.g. air or $O_2$) is allowed to pass along and in contact with the cathode of the system. As a result, the fuel is oxidized, with the oxidizing gas being reduced in order to generate electricity. The electrolyte is designed to allow charge transfer between the anode and cathode. Basic aspects of fuel cell technology including the concepts described above are well known in the art and again discussed in U.S. Pat. Nos. 4,522,894 to Hwang et al.; 4,555,453 to Appleby; 4,567,117 to Patel et al.; 4,629,537 to Hsu; 4,721,556 to Hsu; 4,950,562 to Yoshida et al.; 4,997,727 to Bossel; 5,034,288 to Bossel; 5,069,987 to Gordon; and 5,110,692 to Farooque et al., all of which are incorporated herein by reference.

In order to produce fuel cell systems with a high degree of electrical output, stacked arrangements of multiple fuel cell units have been developed. To achieve electrical continuity in stacked systems and in order to separate adjacent fuel cell units, a structure known as a "bipolar plate" is provided between each fuel cell unit in the stack. Specifically, each bipolar plate in the fuel cell stack is positioned against and in contact with the cathode of one fuel cell unit in the stack and the anode of another fuel cell unit in the stack. As a result, one side of the bipolar plate is positioned against the cathode of one fuel cell unit, while the other side of the bipolar plate is positioned against the anode of the next successive fuel cell unit in the stack. The bipolar plates in a stacked fuel cell system are important components which must provide a high degree of electrical conductivity with a sufficient level of thermal shock resistance to ensure efficient operation of the fuel cell system. In addition, the selected bipolar plates must have a structure and composition which facilitates the secure attachment thereof to adjacent components in the fuel cell stack.

A. Bipolar Interconnection Plate Structure and Function

The bipolar interconnection plates described herein offer numerous benefits in structure, function, and design. As described in greater detail below, each bipolar interconnection plate of the present invention is characterized by (1) increased ductility; (2) increased shock resistance; (3) reduced material/processing costs; (4) enhanced electrical performance due to a higher degree of electrical conductivity; (5) a reduced coefficient of thermal expansion (hereinafter "CTE") which is more precisely matched with other components in the fuel cell power generation system so that cracking and physical deterioration problems are avoided; and (6) the capability for internal catalytic activity regarding steam reformation of hydrocarbon materials. Accordingly, the bipolar interconnection plate structure described below represents an advance in the art of fuel cell technology in numerous respects.

Figure 1:
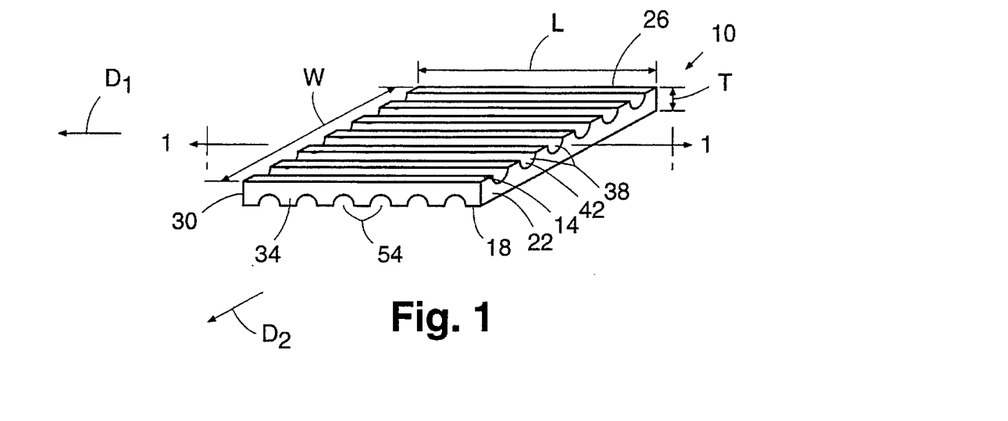
FIG. 1 is a top perspective schematic view of an exemplary bipolar interconnection plate produced in accordance with the present invention wherein the gas flow channels are illustrated.
Figure 2:
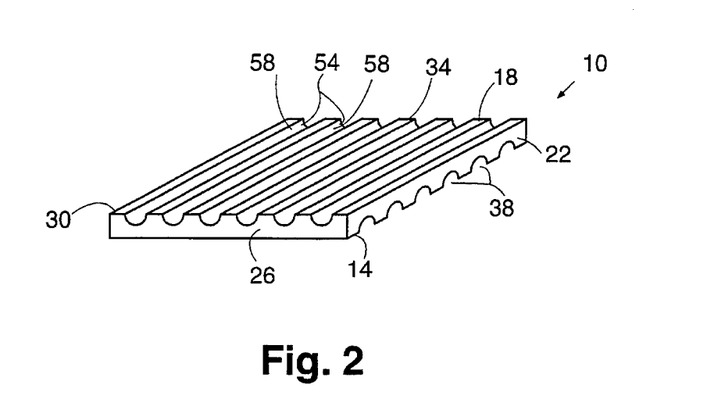
FIG. 2 is a perspective schematic view of the bipolar interconnection plate of FIG. 1 which has been rotated to illustrate the underside (second side) of the plate having the fuel flow channels therein.
Figure 3:
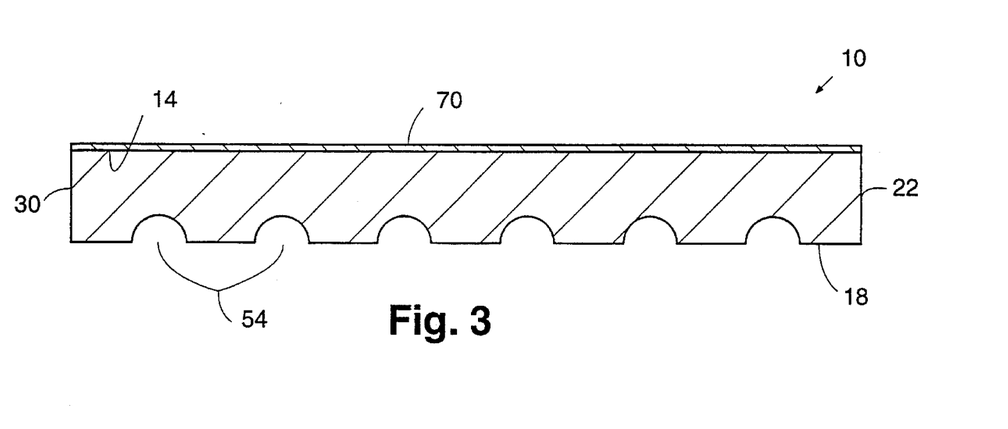
FIG. 3 is an enlarged schematic cross-sectional view of the bipolar interconnection plate of FIG. 1 taken along line 1—1, with the layer of protective coating on the first side thereof also being enlarged for the sake of clarity.

With reference to FIGS. 1–3, an exemplary bipolar interconnection plate 10 produced in accordance with the present invention is illustrated. Production methods and techniques associated with the plate 10 will be described in greater detail below. The plate 10 shall not be limited to any particular dimensional characteristics which may vary depending on the desired size and electrical generation capabilities of the fuel cell power system in which it is to be used. In an optimum and preferred embodiment, the plate 10 will have an average thickness "T" (FIG. 1) ranging from about 0.1–0.3 cm, a length "L" ranging from about 10.0–25.0 cm, and a width "W" ranging from about 10.0–25.0 cm, although the present invention shall not be limited to these dimensional parameters. The plate 10 is planar in construction, with the unique materials and manufacturing processes described below contributing to a high degree of planarity associated with plate 10.

With continued reference to FIGS. 1–3, the plate 10 further includes an upper or first side 14 and a lower or second side 18 which is substantially parallel to the first side 14. Also included are planar end faces 22, 26, 30, 34. In a preferred embodiment, end face 22 is parallel to end face 30, with end face 26 being parallel to end face 34.

With particular reference to FIG. 1, the first side 14 of the plate 10 includes a plurality of elongate gas flow channels 38 therein which are designed to receive air or other oxidizing gases (e.g. $O_2$). The channels 38 extend continuously along and within the first side 14 of the plate 10 from the end face 22 to the end face 30. The number of channels 38 will vary, depending on the size and character of the fuel cell system in which the plate 10 is being used. A representative plate 10 will include between about 25–500 channels 38, with all of the channels 38 being parallel to and equally spaced from each other by a preferred distance of about 0.5–3.0 mm. The cross-sectional character of each channel 38 can be varied during production, and may be V-shaped or U-shaped as desired, with a substantially U-shaped configuration being illustrated in FIGS. 1–3. In a preferred embodiment, the depth of each channel 38 will involve a value which is about 10–50% of the total thickness "T" of the plate 10. However, the precise depth value will vary, depending on a wide variety of operational parameters which may be determined in accordance with preliminary pilot studies on the fuel cell system of interest.

As illustrated in FIG. 1, each channel 38 is substantially U-shaped, and includes an external surface 42. In a preferred embodiment, all of the channels 38 extend longitudinally along the first side 14 of the plate 10 in a first direction indicated in FIG. 1 by arrow $D_1$. As stated above, the channels 38 are designed to receive oxidizing gases therein during operation of the fuel cell system so that the electrochemical conversion of fuel materials can occur in accordance with conventional fuel cell technology as previously discussed.

With reference to FIG. 2, the plate 10 has been rotated to illustrate the second side 18 thereof. The second side 18 of the plate 10 includes a plurality of elongate fuel flow channels 54 therein which are designed to receive fuel materials. As described in greater detail below, the bipolar interconnection plate 10 and fuel cell systems associated therewith shall not be limited to the use of any particular oxidizing gases or fuel materials. Exemplary fuel materials include but are not limited to diesel fuel, methane, and other hydrocarbon compositions. The channels 54 extend continuously along and within the second side 18 of the plate 10 from the end face 26 to the end face 34. The number of channels 54 will again vary depending on the size and character of the fuel cell system in which the plate 10 is being used. A representative plate 10 will include the same number of channels 54 as the channels 38 (e.g. between about 35–500 channels 54), with all of the channels 54 being parallel to and equally spaced from each other by a preferred distance of about 0.5–3.0 mm. The cross-sectional character of each channel 54 can likewise be varied during production, and may be V-shaped or U-shaped as desired, with a U-shaped configuration being illustrated in FIGS. 1–3. In a preferred embodiment, the depth of each channel 54 will involve a value which is about 10–50% of the total thickness "T" of the plate 10. However, the precise depth value will vary, depending on a wide variety of operational parameters which may be determined in accordance with preliminary pilot studies on the fuel cell system of interest. As illustrated in the embodiment of FIGS. 2–3, each channel 54 is substantially U-shaped, with an external surface 58. In a preferred embodiment, all of the channels 54 extend longitudinally along the second side 18 of the plate 10 in a second direction indicated in FIG. 1 by arrow $D_2$ which is perpendicular to the first direction described above with reference to arrow $D_1$. As indicated above, the channels 54 are designed to receive fuel materials therein during operation of the fuel cell system so that the electrochemical conversion thereof may take place in accordance with conventional fuel cell technology.

The plate 10 is constructed of a unique composition which provides numerous benefits and advantages over conventional bipolar plate systems. Specifically, the plate 10 is manufactured from a selected catalytic intermetallic compound. Intermetallic compounds are substantially different in structure and chemical characteristics from metal alloys. As noted above, an intermetallic compound involves a chemical compound of fixed structure and atomic composition. In particular, an intermetallic compound typically consists of two types of metal atoms (e.g. A and B) which are combined in a fixed ratio (e.g. AB, $A_3B$, $AB_3$, and the like) with a very narrow variation in these ratios. Intermetallic compounds have distinct mechanical and physical properties that are different from metal A, metal B, or solid solutions (alloys) of B atoms mixed into metal A or A atoms mixed into metal B. For example, intermetallic compounds have very distinctive melting points and crystalline structures compared with alloys involving a mixture of metal A and metal B atoms. Metal alloys specifically involve a combination of two or more atoms in a wide range of compositions which retain the same basic crystalline structure associated with the majority (predominant) atom. This is not the case with intermetallic compounds in which metal atoms are combined in fixed ratios and have distinctive structural configurations. Accordingly, metal alloys and intermetallic compounds are significantly different from each other, with such differences being well known to individuals skilled in the metallurgical arts.

Exemplary and preferred intermetallic compounds suitable for use in the present invention involve NiAl and $Ni_3Al$. These materials and the general use of intermetallic compounds in the plate 10 are preferred for numerous important reasons. Specifically, intermetallic compounds of the type described herein produce structural components which are highly porous with a considerable amount of internal space therein which is not present in components produced from metal alloys. It is desirable that the plate 10 have a significant degree of porosity so that reactants can pass therethrough during operation of the fuel cell system. In particular, NiAl and $Ni_3Al$ are highly electrically conductive, and have a unique crystal structure which enables a significant degree of porosity to be achieved in the plate 10 unlike dense metal alloys or super-alloys. From a physical standpoint, intermetallic NiAl has a B2 or beta-brass type superlattice structure with a high melting point (e.g. about 1638° C). Intermetallic $Ni_3Al$ has an $L1_2$ structure with a correspondingly high melting point (e.g. about 1395° C). Other benefits associated with the use of intermetallic compounds include but are not limited to higher oxidation resistance, lower material costs, lower fabrication costs achieved through the use of near-net shape powder metallurgy techniques, higher catalytic activity, and lower weight due to the particular crystal structures involved.

Regarding the use of NiAl or $Ni_3Al$, such materials are of considerable value in the present invention since they are capable of catalyzing the steam reformation of hydrocarbon fuels (e.g. diesel fuel or methane gas) into hydrogen, carbon monoxide, and carbon dioxide in accordance with the following formula:

$$\text{Hydrocarbon fuel} + H_2O \rightarrow H_2 + CO + CO_2$$

For example, in the case of methane steam reforming, the following reactions occur:

$$CH_4 + H_2O \rightleftharpoons CO + 3H_2$$
$$CO + H_2O \rightleftharpoons CO_2 + H_2$$
$$\overline{CH_4 + 2H_2O \rightleftharpoons CO_2 + 4H_2}$$

This is a unique aspect of the present invention, and substantially contributes to enhanced fuel cell efficiency. The ability of plate 10 to permit "internal reforming" in accordance with the foregoing reaction likewise avoids the use of external reforming units which are often used separately in connection with conventional fuel cell systems. In addition, because of the high degree of porosity in the plate 10 as described above, a significant amount of internal surface area exists therein for catalysis to occur. Further information regarding the porosity characteristics of the plate 10 will be discussed below.

Randomly dispersed within the intermetallic compound used to produce the plate 10 is a supply of at least one ceramic filler composition. Many different types of ceramic filler compositions/powders may be used for this purpose, and the present invention shall not be limited to any particular type of filler composition. Exemplary and preferred ceramic filler compositions include but are not limited to alumina, zirconia, calcium zirconium phosphate, strontium zirconium phosphate, zirconium silicate, mullite, and cordierite. The randomly distributed ceramic filler composition within the intermetallic structure of plate 10 is a unique feature thereof, and likewise provides numerous benefits including but not limited to (1) the absorbing of heat during the production process so that warpage and other structural disfiguration of the plate 10 is prevented; and (2) an increase in the porosity of plate 10 in order to produce a porous plate structure having reduced weight and more internal surface area therein. Increased porosity (which results from use of the ceramic filler composition and intermetallic materials instead of metal alloys) is of considerable value for the reasons listed above. As previously noted, increased porosity provides additional surface area within the plate 10 for internal steam reforming of hydrocarbons to be catalyzed. Another benefit associated with use of the ceramic filler composition involves a lowering of the CTE value associated with plate 10 compared with plate structures manufactured from the intermetallic compound which lack any ceramic filler composition therein. As a result, the CTE value of the plate 10 may be more precisely matched with the CTE values of other components in the fuel cell system.

Finally, the first side 14 of the plate 10 which includes the gas flow channels 38 therein is covered with an electrically conductive protective coating 70 (FIG. 3) that is designed to prevent oxidation of the plate 10. The protective coating 70 also prevents fuel gases (e.g. $H_2$ and CO) from migrating into the plate 10 via the gas flow channels 38 and burning (combusting) without participating in the basic fuel cell reaction processes. The protective coating 70 is optimally applied to the first side 14 of the plate 10 in a layer of uniform thickness in order to cover the entire first side 14 (including the channels 38 and external surfaces 42 thereof). As previously noted, the protective coating 70 will preferably consist of strontium-doped lanthanum chromite ($La_{1-x}Sr_xCrO_3$; x=0.1–0.4) and calcium-doped lanthanum chromite ($La_{1-x}Ca_xCrO_3$; x=0.1–0.4). These materials are preferred because they are electrically conductive in both an oxidizing atmosphere ($PO_2$=about $10^{-1}$ atm) and a reducing atmosphere ($PO_2$=about $10^{-20}$ atm) which are present on both the first (cathode) side 14 and second (anode) side 18 of the bipolar plate 10. Chromite materials have been experimentally demonstrated to retain a higher electrical conductivity in reducing atmospheres and are stable (e.g. do not decompose) in connection with lower oxygen partial pressures. Other compositions suitable for use in connection with the protective coating 70 include but are not limited to strontium-doped lanthanum cobaltite ($La_{1-x}Sr_xCoO_3$; x=0.1–0.4) (calcium-doped lanthanum cobaltite ($La_{1-x}Ca_xCoO_3$; x=0.1–0.4), strontium-doped gadolinium cobaltite ($Gd_{1-x}Sr_xCoO_3$; x=0.1–0.4), calcium-doped gadolinium cobaltite ($Gd_{1-x}Ca_xCoO_3$; x=0.1–0.4), strontium-doped yttrium chromite ($Y_{1-x}Sr_xCrO_3$; x=0.1–0.6), calcium-doped yttrium chromite ($Y_{1-x}Ca_xCrO_3$; x=0.1–0.6), strontium-doped neodymium chromite ($Nd_{1-x}Sr_xCrO_3$; x=0.1–0.4), calcium-doped neodymium chromite ($Nd_{1-x}Ca_xCrO_3$; x=0.1–0.4), strontium-doped yttrium ferrite ($Y_{1-x}Sr_xFeO_3$; x=0.1–0.4), and calcium-doped yttrium ferrite ($Y_{1-x}Ca_xFeO_3$; x=0.1–0.4). Thus, the present invention shall not be limited exclusively to any particular electrically conductive coating materials.

In a preferred embodiment, the protective coating 70 will be applied to the first side 14 of the plate 10 (including the gas flow channels 38) so that these structures are covered at a thickness level of about 3–10 microns. To apply the protective coating 70, many different conventional techniques may be used including but not limited to atmospheric pressure plasma spraying, reduced pressure plasma spraying, chemical vapor deposition, and reactive sputtering. Another technique which may be used involves a unique procedure called "liquid injection plasma deposition". This procedure and other procedures suitable for applying the protective coating 70 will be described in greater detail below.

The _ plate 10 will have a high degree of pl_ be of near-net shape as discussed in the volving methods and procedures. In a t, the completed plate 10 will be com-% by weight of the selected interme- or $Ni_3Al$), and about 20–60% by ramic filler composition. The plate 10 will have an average CTE of between about $10 \times 10^{-6\circ}$ to $14 \times 10^{-6\circ}$ $C.^{-1}$, with the ultimate CTE value depending on the type and quantity of materials being used to produce the plate 10 (especially with respect to the amount and type of ceramic filler composition being used). The selected CTE characteristics associated with the plate 10 will depend on the CTE values of the other components used in the fuel cell system (e.g. the anodes and cathodes). It is preferred that a plate 10 be used with a CTE value which closely approximates the CTE values of the other components in the fuel cell system so that problems associated with differential expansion (e.g. cracking and structural deformation) are avoided. Accordingly, the selection of raw materials to produce a plate 10 with a given CTE value will be undertaken in connection with preliminary pilot studies involving the fuel cell system of interest.

In addition, the plate 10 will have a porosity level of about 30–60%, again depending on the type and amount of raw materials being used in the production process. The term "porosity level" as used herein shall involve the amount of void/unoccupied space within the plate 10 relative to the total volume of the plate 10. For example, if a particular plate 10 produced in accordance with the present invention has a porosity level of 50%, then 50% of the internal volume of the plate 10 will consist of void, open space. Finally, in accordance with the numerical parameters set forth above, exemplary plates 10 produced in connection with the present invention will have a minimal weight per unit volume (typically about 2.4–3.5 g/cc), with a strength level (e.g. modulus of rupture) of about 80–120 MPa, again depending on a wide variety of factors including the size, shape, thickness, and specific materials used in the production process. The completed plate 10 is characterized by numerous benefits including but not limited to (1) a high degree of strength and shock resistance; (2) a substantially planar configuration with minimal warpage and/or deformation; (3) a high level of porosity, the benefits of which are described above; (4) significant catalytic capabilities regarding steam reformation of hydrocarbons; (5) a CTE which, depending on production parameters, may be matched to the CTE values of other components in the fuel cell system; and (6) a high electrical conductivity level resulting from the use of NiAl or $Ni_3Al$. These benefits are achieved as a direct result of the materials and components used to manufacture the plate 10, as well as the specific manufacturing processes described below. It should also be noted that the present invention shall not be strictly limited to the numerical parameters listed above which are provided as preferred embodiments for example purposes.

Figure 4:
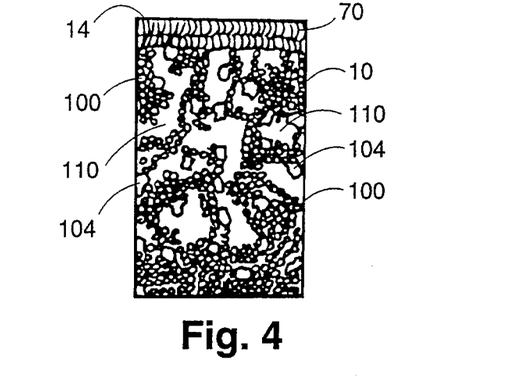
FIG. 4 is an enlarged schematic cross-sectional view of a portion of the bipolar plate of FIG. 1 as it would appear at a magnification of about 150 times which illustrates the protective coating thereon, the randomly-dispersed ceramic filler composition within the plate, and the porous character of the plate resulting from the use of intermetallic compounds and ceramic filler materials.

FIG. 4 involves an enlarged schematic (illustrative) cross-sectional view of a portion of the bipolar plate 10 of FIG. 1 as it would appear at a magnification of 150 times. FIG. 4 specifically illustrates the protective coating 70 on the first side 14 of the plate 10, the randomly-dispersed ceramic filler composition within the plate 10, and the porous character of the plate 10 resulting from the use of intermetallic compounds and ceramic filler materials. With continued reference to FIG. 4, the plate 10 includes intermetallic compound 100 (e.g. NiAl or $Ni_3Al$) surrounded by randomly dispersed portions of the ceramic filler composition 104. Also indicated at reference number 110 are void or open (unoccupied) spaces within the plate 10 which result from use of the foregoing intermetallic materials in combination with a selected ceramic filler composition as described above.

As previously noted, the bipolar interconnection plate 10 of the present invention is designed for use in a stacked multiple fuel cell power generation system. In particular, each plate 10 is adapted for placement between two fuel cell units in the stack, with each fuel cell unit including an anode member, a cathode member, and a portion of electrolyte material therebetween. With reference to the schematic illustration of FIG. 5, an exemplary stack 120 consisting of multiple fuel cell units 124 each having a bipolar interconnection plate 10 associated therewith is shown. In particular, each fuel cell unit 124 is separated from an adjacent fuel cell unit by a plate 10. With continued reference to FIG. 5, each fuel cell unit 124 includes an anode member 128, a cathode member 132, and a portion of solid electrolyte material 136 between the anode member 128 and the cathode member 132. As indicated above, the present invention shall not be limited to use in connection with any particular fuel cell system, and is prospectively applicable to a wide variety of different systems. In this regard, the anode member 128, the cathode member 132, and the portion of electrolyte material 136 shall not be limited to any particular dimensional characteristics, construction materials, or attachment methods relative to the plate 10 and other components of the system.

Exemplary materials used to construct the anode member 128 include but are not limited to a combination of elemental Ni and zirconia (conventionally known as "cermet"), elemental Ni and zirconia (stabilized with magnesium oxide, calcium oxide, yttrium oxide, and/or scandium oxide), elemental Ni and ceria (doped with yttrium oxide, zirconium oxide, lanthanum oxide, and/or calcium oxide), elemental Co and zirconia (stabilized with magnesium oxide, calcium oxide, yttrium oxide, and/or scandium oxide), elemental Ru and zirconia (stabilized with magnesium oxide, calcium oxide, yttrium oxide, and/or scandium oxide), solid solutions of $Y_2O_3$-$ZrO_2$-$TiO_2$, platinum, palladium, and silver.

The cathode member 132 may be constructed from a wide variety of materials including but not limited to lanthanum manganite, platinum, palladium, gold, silver, doped lanthanum cobaltite, doped $In_2O_3$, doped $YMnO_3$, $In_2O_3$-$PrO_2$-$HfO_2$ solid solutions, and $In_2O_3$-$PrO_2$-$ZrO_2$ solid solutions.

Finally, exemplary electrolyte compositions appropriate for use in connection with the electrolyte material 136 include but are not limited to zirconia (stabilized with yttria, calcia, magnesia, scandia, ytterbia, ceria, and/or india), doped $CeO_2$, doped $LaGaO_3$, doped $Bi_2O_3$, $BaCe_{0.9}Gd_{0.1}O_3$, $CaAl_{0.7}Ti_{0.3}O_3$, and $SrZr_{0.9}Sc_{0.1}O_3$.

Figure 5:
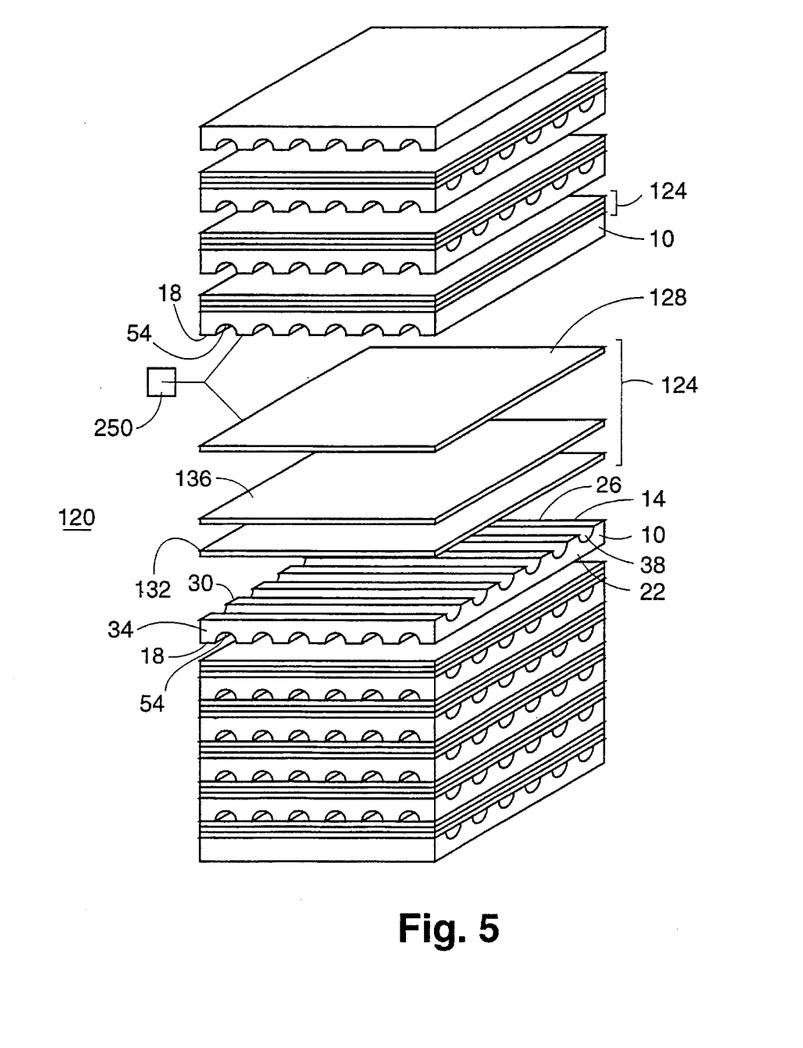
FIG. 5 is a front perspective partially exploded schematic view of a stacked, multiple fuel cell power generation system having a plurality of fuel cell units therein which are separated from each other by bipolar interconnection plates produced in accordance with the invention.

As illustrated in FIG. 5, the first side 14 of each plate 10 which includes the gas flow channels 38 and the electrically conductive protective coating 70 thereon (not visible in FIG. 5) is positioned against and in contact with the cathode member 132 of one of the fuel cell units 124. Likewise, the second side 18 of each plate 10 which includes the fuel flow channels 54 therein is positioned against and in contact with the anode member 128 of one of the fuel cell units 124. As a result, an integrated stack 120 of fuel cell units 124 is created with bipolar plates 10 therebetween which is highly durable, efficient, and includes all of the beneficial characteristics of plates 10 as described above. An example of a specific stacked fuel cell system using the plates 10 of the present invention will be described in the "Example" section provided below.

B. Bipolar Interconnection Plate Production

Figure 6:
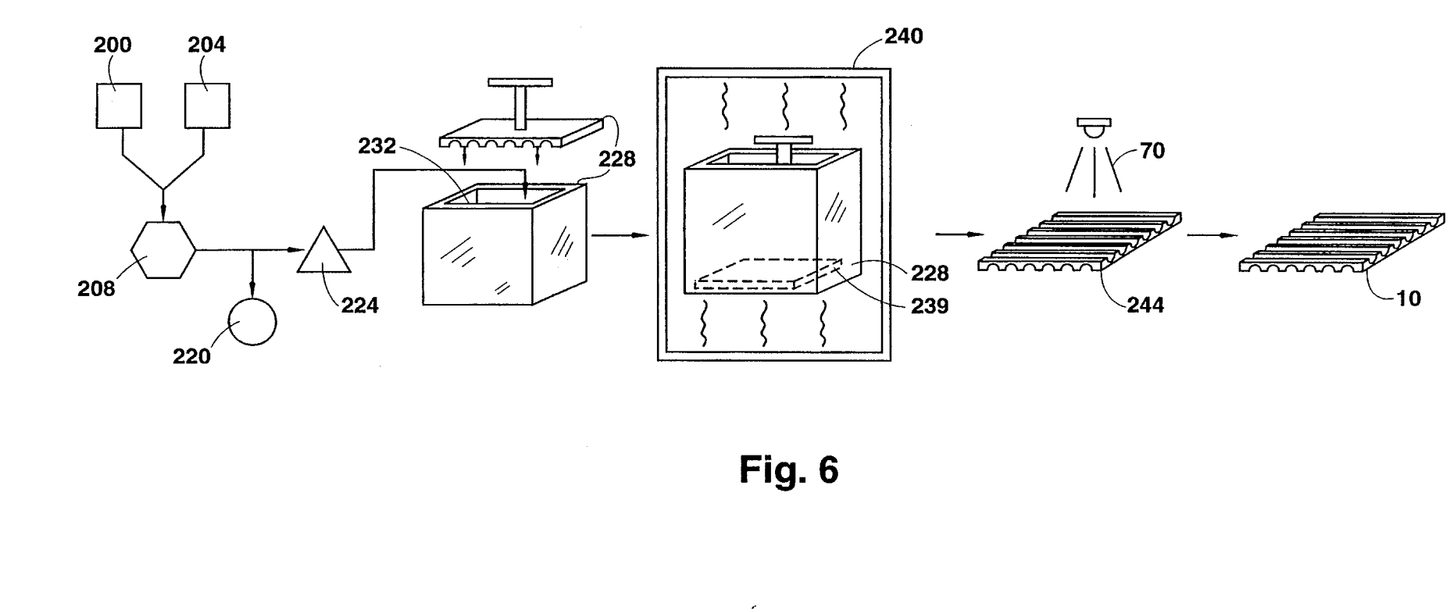
FIG. 6 is a sequential, schematic illustration of the process steps used in connection with the production of a bipolar interconnection plate in accordance with the invention.

With reference to FIG. 6, a schematic illustration regarding the process steps used to produce the bipolar interconnection plate 10 is provided. As shown in FIG. 6, a supply of elemental Al powder 200 and a supply of elemental Ni powder 204 are first provided. In a preferred embodiment, the supply of elemental Al powder 200 will have a particle size of about 20–40 microns, with the supply of elemental Ni powder 204 having a particle size of about 3–7 microns. These materials are combined with each other to produce a mixed metal product designated at reference number 208 in FIG. 6. If the selected bipolar interconnection plate 10 is to be constructed from intermetallic NiAl, the elemental Al powder 200 and the elemental Ni powder 204 will be combined in an Al:Ni molar ratio of about 1:1 to form a mixed metal product 208 containing equimolar amounts of Ni and Al. However, if the selected bipolar interconnection plate 10 is to be manufactured from $Ni_3Al$, the elemental Al powder 200 and elemental Ni powder 204 will be combined in an Al:Ni molar ratio of about 1:3 to form a mixed metal product 208 which contains three moles of Ni for each mole of Al.

Next, the mixed metal product 208 is combined with a supply of a powdered ceramic filler composition (hereinafter designated as "ceramic filler powder" 220. Exemplary ceramic filler compositions suitable for use as the ceramic filler powder 220 are listed above. In a preferred embodiment, the selected ceramic filler powder 220 will have an average particle size of about 30–50 microns. Regarding the amount of ceramic filler powder 220 to be used, it is preferred that the ceramic filler powder 220 be added to the Ni-Al mixed metal product 208 in a ceramic filler powder: Ni-Al mixed metal product volume ratio of about 1:0.43 to 1:2.33. In this regard, each gram of ceramic filler powder 220 will be combined with about 0.56–3.1 grams of the mixed metal product 208 containing elemental Ni and Al therein. The foregoing quantitative information regarding the amount of ceramic filler powder 220 to be used shall be applicable whether the Al:Ni molar ratio in the mixed metal product 208 is 1:1 or 1:3 as noted above. In accordance with the foregoing parameters, the combined elemental Al powder 200, elemental Ni powder 204, and ceramic filler powder 220 will produce a mixture 224 which, in a preferred embodiment, will contain about 25.0–75.0% by weight ceramic filler powder 220, about 11.0–23.6% by weight elemental Al powder 200, and about 24.0–51.4% by weight elemental Ni powder 204. The foregoing numerical parameters may be varied in accordance with preliminary pilot studies based on the intended use of the completed bipolar plate 10.

The mixture 224 is thereafter subjected to sufficient compressive forces (e.g. pressures) in order to produce a tightly packed structure from the mixture 224. Compression of the mixture 224 may be accomplished within a mold 228 which is schematically illustrated in FIG. 6. Many different types of conventional molding systems may be used in connection with mold 228, and the present invention shall not be limited to the use of any particular molding devices. The interior characteristics of the mold 228 will enable the plate 10 (and channels 38, 54) to be properly formed within the mold 228. In a preferred embodiment, the mold 228 will consist of a hardened stainless steel exterior portion with a graphite inner liner (not shown), although other conventional materials normally used in molding technology of the type described herein may also be used. Once the mixture 224 is positioned within the internal chamber 232 of the mold 228, it is compressed within the mold 228 so that uniaxial pressure is exerted on the mixture 224, followed by the exertion of isostatic pressing forces on mixture 224. As a result, a compressed product 239 (illustrated schematically in phantom lines in FIG. 6) is produced within the mold 228. In a preferred embodiment, the amount of pressure to be applied to the mixture 224 within the mold 228 will be about 10,000–30,000 psi. Alternatively, the mixture 224 can be compressed at the foregoing pressure level using a number of different conventional compression techniques including roll compaction or extrusion. The present invention shall therefore not be limited to any particular compression method although the molding process described above is preferred.

The mold 228 and compressed product 239 therein are then placed in a furnace 240 or other conventional heating apparatus and heated to a temperature of about 600°–1000° C. over a time period of about 20–30 minutes. It should be noted that the heating step described above which is used in connection with the compressed product 239 will be applicable regardless of the methods and systems used to compress the mixture 224. Also, heating may be accomplished during or after compression, although it is preferred that heating be undertaken after compression is completed. Heating of the mold 228 and compressed product 239 therein causes a solid state combustion reaction to occur which evolves a substantial amount of heat. As a result, the compressed product 239 solidifies and is converted to a porous intermetallic plate structure 244 which has a shape corresponding to the internal dimensional characteristics of the mold 228. The density and porosity of the intermetallic plate structure 244 will depend on many factors including the particle size of the materials used to manufacture the intermetallic plate structure 244 (e.g. the elemental Al powder 200, elemental Ni powder 204, and ceramic filler powder 220), the amount of each ingredient being used, and other factors. During this process, use of the mold 228 assists in the removal of excess heat and prevents the production of an intermetallic plate structure 244 which is warped or otherwise disfigured. Also, structural disfigurement is prevented through the use of ceramic filler powder 220 which effectively absorbs heat during the production process.

After removal from the mold 228, intermetallic plate structure 244 is preferably allowed to cool to about 300° C. in a nitrogen atmosphere over an average time period of about 0.5–1.0 hours, and thereafter cooled in air to room temperature (about 70° F.) over an average time period of about 1.0 hour. The cooled intermetallic plate structure 244 will constitute the bipolar interconnection plate 10 of the present invention which can be used in a stacked fuel cell power generation system as described above. The plate 10 produced from the intermetallic plate structure 244 will consist of a metallic matrix comprised of intermetallic NiAl or $Ni_3Al$ having the ceramic filler powder 220 randomly dispersed therein. However, prior to use of the intermetallic plate structure 244 as the bipolar interconnection plate 10, at least a portion of the plate 10 (e.g. the first side 14 and channels 38 therein) is coated with the electrically conductive protective coating 70. Specific examples of the protective coating 70 and related technical information involving the coating 70 are previously discussed in Section "A" above. Many different techniques may be used to apply the protective coating 70 including the following conventional processes: reactive sputtering, chemical vapor deposition, atmospheric pressure plasma spraying, and reduced pressure plasma spraying. Accordingly, the present invention shall not be limited to the use of any particular technique for application of the protective coating 70. Another important method for applying the protective coating 70 involves a new and unique process known as liquid injection plasma deposition (hereinafter "LIPD"). As noted above, LIPD basically involves (1) dissolving salts (e.g. nitrates) containing selected metals in water or alcohol to form a solution, with the selected metals corresponding to the metals in the compositions to be deposited; (2) using hydrostatic pressure to inject the solution into a hot plasma typically generated by a direct current (DC) arc or radio frequency (RF) device operating using a carrier gas consisting of argon, helium, hydrogen or other comparable gases; (3) allowing the dissolved metal salt materials within the solution to decompose into particles and vapor containing mixed cation oxides; and (4) impinging the vapor and particles onto the desired surface to be coated, with the surface being maintained at 1 atm pressure or a partial vacuum. LIPD is advantageous in applying the protective coating 70 because it provides an inexpensive, rapid, and efficient method for delivering a thin, dense coating to the plate 10. Under the proper circumstances to be determined and optimized by preliminary pilot studies, the selected coatings can be made in a highly dense state due to the deposition of a mixture of particles homogeneously nucleated in the gas phase and crystallites heterogeneously nucleated from the gas phase at the surface of the selected substrate.

After application of the protective coating 70, the completed bipolar interconnection plate 10 is available for use in a stacked fuel cell power generation system. The plate 10 is characterized by the numerous benefits described above, and produces a fuel cell system of enhanced operating efficiency.

C. Example

An exemplary stacked multiple fuel cell power generation system was produced using a plurality of bipolar interconnection plates of the type described above. Specifically, multiple fuel cell units were prepared, with each unit including an anode, a cathode, and a portion of electrolyte material between the anode and cathode. A bipolar interconnection plate of the type illustrated in FIGS. 1–4 and described above was positioned between adjacent fuel cell units. Each bipolar interconnection plate was manufactured using the procedures described above, and consisted of about 66.3% by weight intermetallic NiAl and about 33.7% by weight ceramic filler composition (zirconia) randomly dispersed within the intermetallic matrix. Each bipolar interconnection plate had a porosity level of about 50% as defined above. Furthermore, the first side of each plate containing the gas flow channels therein was coated using LIPD with a protective coating of strontium-doped lanthanum chromite (formula: $La_{0.85}Sr_{0.15}CrO_3$) at a thickness of about 3–6 microns. Each completed plate had a length of 50.8 mm, a width of 50.8 mm, a thickness of 2500 microns, and a CTE of about $10.5 \times 10^{-6}$ to $11.0 \times 10^{-6}$ $C.^{-1}$ Positioned on the first side of each plate (but not filling the gas flow channels) was a porous cathode constructed from a layer of lanthanum manganite having a thickness of 250 microns. The lanthanum manganite used to construct the cathode was applied using conventional plasma deposition techniques. To prevent the lanthanum manganite composition from filling the gas flow channels, a transient material consisting of graphite powder plus furfural alcohol resin (commercially available from Occidental Chemical Co. of Dallas, Texas (USA) under the designation "Durez 16470") was introduced into the channels prior to plasma deposition of the lanthanum manganite. The foregoing material was also combined with a small amount of propanol/nitric acid activating agent prior to deposition. The lanthanum manganite was then applied directly to the first side of the bipolar interconnection plate and onto the transient material. After completion of the plasma deposition process, the transient material was removed by the application of heat within a furnace at a temperature level of about 600°–800° C. in an air atmosphere for about 1.0 hour in order to burn off or combust the transient material, thereby opening the gas flow channels. The completed cathode layer had a CTE value of about $10.5 \times 10^{-6}$ $C.^{-1}$.

Positioned on top of the cathode and affixed thereto was a dense layer of electrolyte material constructed from zirconia having a thickness of 3 microns. The layer of electrolyte material was applied using LIPD techniques as described above, and had a CTE value of about $10.3 \times 10^{-6}$ to $10.8 \times 10^{-6}$ $C.^{-1}$.

Affixed to and positioned on top of the layer of electrolyte material was a porous anode constructed from elemental Ni in combination with $ZrO_2$ (comprising a composition conventionally known as "cermet"). This material was applied by conventional plasma deposition techniques. The anode was applied at a thickness of 3000 microns, and completely covered the layer of electrolyte material described above. The anode layer had a CTE value of about $11.0 \times 10^{-6}$ to $11.5 \times 10^{-6}$ $C^{-1}$.

Each fuel cell unit (consisting of a cathode, a layer of electrolyte, and an anode) was configured in a seven unit stack. Within the stack, each fuel cell unit was separated from adjacent fuel cell units by one of the bipolar interconnection plates. To secure the fuel cell units within the stack to each other, at least one (and preferably all) of the bipolar interconnection plates in the stack are bonded/attached to the anode of one of the fuel cell units in the stack. Bonding was accomplished by furnace brazing using a selected metal brazing alloy (schematically illustrated in FIG. 5 at reference number 250) fixedly secured/applied to both the interconnection plate and anode of the fuel cell unit adjacent thereto (e.g. the brazing alloy being secured to the interconnection plate and anode in a position therebetween). Specifically, a Ni-Co-Cr brazing alloy manufactured by the Union Carbide Corp. of Indianapolis, Ind. (USA) under the designation "Co-285" was used. This material contained 10.5% by weight Ni, 7.5% by weight W, 56.5% by weight Co, and 25.5% by weight Cr. The foregoing material was selected because of its high wetting contact angle which prevents the brazing alloy from wicking into the porous bipolar interconnection plate and porous anode. Also, the foregoing brazing alloy has a high conductivity level, and does not cause dissolution or corrosion problems regarding the bipolar interconnection plate and anode. The brazing temperature used in this Example was 1350° C. It should be noted that the present invention shall not be limited exclusively to the metallic brazing alloy listed above. Other exemplary metallic brazing alloys suitable for use in the present invention include but are not limited to the following commercially available compositions: (1) "AMI Alloy 788" (22% by weight Co, 21% by weight Ni, 14% by weight W, 2% by weight B, 2% by weight Si) sold by Alloy Metals, Inc. of Troy Mich. (USA); (2) "Nicrobraz 210" (51.2% by weight Co, 19% by weight Cr, 17% by weight Ni, 8% by weight Si, 4% by weight W, 0.8% by weight B) sold by Wall Colmonoy Corp. of Madison Heights, Mich. (USA); (3) "Nicrobraz X-1" (proprietary) sold by Wall Colmonoy Corp. of Madison Heights, Mich. (USA); and (4) "Palco" (35% by weight Co, 65% by weight Pd) sold by Wesgo, Inc. of Belmont Calif.(USA). Regardless of which brazing alloy is selected, an alloy should be chosen which has a melting temperature of greater than about 1200° C. since operating temperatures of the fuel cell systems described herein will typically range from about 700°–1000° C. All of the above-listed exemplary brazing alloys have a melting point which substantially exceeds 1200° C. In this regard, the present invention shall not be limited to the use of any particular brazing alloy having a melting point at the level listed above.

Brazing alloys suitable for use in the present invention (including those listed above) are typically in powder form having an average particle size of about 20–200 microns. To use the brazing alloys, a preferred embodiment involves the formation of a slurry from the selected brazing alloy powder using a number of wetting agents including but not limited to water, alcohols (e.g. ethanol), and terpinol. The slurry will typically contain about 85–95% by weight brazing alloy powder therein. The slurry is then applied directly to the lower surface of the selected bipolar plate (e.g. second side 18 of plate 10 as illustrated in FIG. 1) so that it covers the entire surface to form a layer having a thickness of about 20–200 microns. However, in a preferred embodiment, the slurry is selectively applied so that it does not fill the fuel flow channels in the plate (e.g. fuel flow channels 54 in plate 10 as illustrated in FIG. 1). In an alternative embodiment, the slurry may be applied in the same manner described above to the surface of the anode coming in contact with the bipolar plate, or to both the anode and the bipolar plate. After application of the slurry to at least one of the anode and bipolar plate as described above, both of these components are placed against each other and heated to melt the brazing alloy and form a secure weld therebetween. Heating is typically undertaken within a conventional furnace at a temperature range of about 1300°–1350° C. for about 1–10 minutes.

The completed fuel cell stack in the present Example provides numerous benefits including (1) increased electrical performance due to a higher degree of electrical conductivity throughout the stack; (2) increased durability and fewer stress-related problems (e.g. cracking) which were achieved by more precisely matched CTE values in all parts of the system; (3) lower material and production costs; and (4) substantially increased operating efficiency resulting from the internal catalytic activity of the NiAl bipolar plates as described above. Regarding item (4), pilot studies using No. 2 diesel fuel demonstrated that the foregoing system was capable of high conversion rates (e.g. over 94% conversion of the diesel fuel into $H_2$ and CO at 1013° C.) Notwithstanding the information provided above, the present invention shall not be limited to the parameters, materials and construction methods described in this Example.

In accordance with the description provided herein, the present invention represents an advance in the art of fuel cell technology and provides numerous benefits as outlined above. Having herein described preferred embodiments of the invention, it is anticipated that suitable modifications may be made thereto by individuals skilled in the art which nonetheless remain within the scope of the invention. In this regard, the present invention shall only be construed in connection with the following claims:

I claim:

1. A bipolar interconnection plate for placement between individual fuel cell units in a stacked, multiple fuel cell power generation system, each fuel cell unit comprising an anode member, a cathode member, and a portion of electrolyte material positioned between said anode member and said cathode member, said bipolar interconnection plate comprising a first side and a second side, said first side comprising a plurality of elongate gas flow channels therein, and said second side comprising a plurality of elongate fuel flow channels therein, said plate being comprised of a catalytic intermetallic compound capable of catalyzing steam reforming of hydrocarbon fuel compositions into hydrogen, carbon monoxide, and carbon dioxide during operation of said fuel cell power generation system, said intermetallic compound being selected from the group consisting of NiAl and $Ni_3Al$, said plate further comprising at least one ceramic filler composition randomly dispersed therein in order to form a porous plate structure having a lower coefficient of thermal expansion compared with plate structures comprised of said intermetallic compound which lack said ceramic filler composition.

2. The bipolar interconnection plate of claim 1 wherein said plate is comprised of about 40–80% by weight said intermetallic compound and about 20–60% by weight said ceramic filler composition.

3. The bipolar interconnection plate of claim 1 wherein said ceramic filler composition is selected from the group consisting of zirconia, zirconium silicate, mullite, alumina, calcium zirconium phosphate, strontium zirconium phosphate, and cordierite.

4. The bipolar interconnection plate of claim 1 wherein all of said gas flow channels in said first side of said plate are parallel to each other and extend longitudinally along said plate in a first direction, and all of said fuel flow channels in said second side of said plate are parallel to each other and extend longitudinally along said plate in a second direction, said second direction being perpendicular to said first direction.

5. A bipolar interconnection plate for placement between individual fuel cell units in a stacked, multiple fuel cell power generation system, each fuel cell unit comprising an anode member, a cathode member, and a portion of electrolyte material positioned between said anode member and said cathode member, said bipolar interconnection plate comprising a first side and a second side, said first side comprising a plurality of elongate gas flow channels therein, and said second side comprising a plurality of elongate fuel flow channels therein, said plate being comprised of a catalytic intermetallic compound capable of catalyzing steam reforming of hydrocarbon fuel compositions into hydrogen, carbon monoxide, and carbon dioxide during operation of said fuel cell power generation system, said intermetallic compound being selected from the group consisting of NiAl and $Ni_3Al$, said plate further comprising at least one ceramic filler composition randomly dispersed therein in order to form a porous plate structure having a lower coefficient of thermal expansion compared with plate structures comprised of said intermetallic compound which lack said ceramic filler composition, said first side of said interconnection plate comprising an electrically conductive protective coating thereon.

6. The bipolar interconnection plate of claim 5 wherein said protective coating is selected from the group consisting of strontium-doped lanthanum chromite, calcium-doped lanthanum chromite, strontium-doped lanthanum cobaltite, calcium-doped lanthanum cobaltite, strontium-doped gadolinium cobaltite, calcium-doped gadolinium cobaltite, strontium-doped yttrium chromite, calcium-doped yttrium chromite, strontium-doped neodymium chromite, calcium-doped neodymium chromite, strontium-doped yttrium ferrite, and calcium-doped yttrium ferrite.

7. The bipolar interconnection plate of claim 5 wherein said ceramic filler composition is selected from the group consisting of zirconia, zirconium silicate, mullite, alumina, calcium zirconium phosphate, strontium zirconium phosphate, and cordierite.

8. A bipolar interconnection plate for placement between individual fuel cell units in a stacked, multiple fuel cell power generation system, each fuel cell unit comprising an anode member, a cathode member, and a portion of electrolyte material positioned between said anode member and said cathode member, said bipolar interconnection plate comprising a first side and a second side, said first side comprising a plurality of elongate gas flow channels therein, all of said gas flow channels in said first side of said plate being parallel to each other and extending longitudinally along said plate in a first direction, said second side comprising a plurality of elongate fuel flow channels therein, all of said fuel flow channels in said second side of said plate being parallel to each other and extending longitudinally along said plate in a second direction, said second direction being perpendicular to said first direction, said plate being comprised of about 40–80% by weight of a catalytic intermetallic compound capable of catalyzing steam reforming of hydrocarbon fuel compositions into hydrogen, carbon monoxide, and carbon dioxide during operation of said fuel cell power generation system, said intermetallic compound being selected from the group consisting of $Ni_3Al$ and NiAl, said plate further comprising about 20–60% by weight of a ceramic filler composition randomly dispersed therein in order to form a porous plate structure having a lower coefficient of thermal expansion compared with plate structures comprised of said intermetallic compound which lack said ceramic filler composition, said ceramic filler composition being selected from the group consisting of zirconia, zirconium silicate, mullite, alumina, calcium zirconium phosphate, strontium zirconium phosphate, and cordierite, said first side of said interconnection plate comprising an electrically conductive protective coating thereon, said protective coating being selected from the group consisting of strontium-doped lanthanum chromite, calcium-doped lanthanum chromite, strontium-doped lanthanum cobaltite, calcium-doped lanthanum cobaltite, strontium-doped gadolinium cobaltite, calcium-doped gadolinium cobaltite, strontium-doped yttrium chromite, calcium-doped yttrium chromite, strontium-doped neodymium chromite, calcium-doped neodymium chromite, strontium-doped yttrium ferrite, and calcium-doped yttrium ferrite.

9. A stacked, multiple fuel cell power generation system comprising:

a plurality of individual fuel cell units, each fuel cell unit comprising an anode member, a cathode member, and a portion of electrolyte material positioned between said anode member and said cathode member; and a plurality of bipolar interconnection plates, one of said plates being positioned between each of said fuel cell units in said power generation system in order to separate said fuel cell units from each other, each of said bipolar interconnection plates comprising a first side and a second side, said first side comprising a plurality of elongate gas flow channels therein, and said second side comprising a plurality of elongate fuel flow channels therein, each of said plates being comprised of a catalytic intermetallic compound capable of catalyzing steam reforming of hydrocarbon fuel compositions into hydrogen, carbon monoxide, and carbon dioxide during operation of said fuel cell power generation system, said intermetallic compound being selected from the group consisting of NiAl and $Ni_3Al$, each of said plates further comprising at least one ceramic filler composition randomly dispersed therein in order to form a porous plate structure having a lower coefficient of thermal expansion compared with plate structures comprised of said intermetallic compound which lack said ceramic filler composition.

10. The fuel cell power generation system of claim 9 wherein each of said bipolar interconnection plates is comprised of about 40–80% by weight said intermetallic compound and about 20–60% by weight said ceramic filler composition.

11. The fuel cell power generation system of claim 9 wherein said ceramic filler composition is selected from the group consisting of zirconia, zirconium silicate, mullite, alumina, calcium zirconium phosphate, strontium zirconium phosphate, and cordierite.

12. The fuel cell power generation system of claim 9 wherein all of said gas flow channels in said first side of each of said interconnection plates are parallel to each other and extend longitudinally in a first direction, and all of said fuel flow channels in said second side of each of said interconnection plates are parallel to each other and extend longitudinally in a second direction, said second direction being perpendicular to said first direction.

13. The fuel cell power generation system of claim 9 wherein at least one of said bipolar interconnection plates in said fuel cell power generation system is attached to said anode member of one of said fuel cell units by a metallic brazing alloy secured therebetween, said metallic brazing alloy having a melting point greater than about 1200° C.

14. A stacked, multiple-fuel cell power generation system comprising:

a plurality of individual fuel cell units, each fuel cell unit comprising an anode member, a cathode member, and a portion of electrolyte material positioned between said anode member and said cathode member; and a plurality of bipolar interconnection plates, one of said plates being positioned between each of said fuel cell units in said power generation system in order to separate said fuel cell units from each other, each of said plates comprising a first side and a second side, said first side comprising a plurality of elongate gas flow channels therein, and said second side comprising a plurality of elongate fuel flow channels therein, each of said plates being comprised of a catalytic intermetallic compound capable of catalyzing steam reforming of hydrocarbon fuel compositions into hydrogen, carbon monoxide, and carbon dioxide during operation of said fuel cell power generation system, said intermetallic compound being selected from the group consisting of NiAl and $Ni_3Al$, each of said plates further comprising at least one ceramic filler composition randomly dispersed therein in order to form a porous plate structure having a lower coefficient of thermal expansion compared with plate structures comprised of said intermetallic compound which lack said ceramic filler composition, said first side of each of said interconnection plates comprising an electrically conductive protective coating thereon.

15. The fuel cell power generation system of claim 14 wherein said protective coating is selected from the group consisting of strontium-doped lanthanum chromite, calcium-doped lanthanum chromite, strontium-doped lanthanum cobaltite, calcium-doped lanthanum cobaltite, strontium-doped gadolinium cobaltite, calcium-doped gadolinium cobaltite, strontium-doped yttrium chromite, calcium-doped yttrium chromite, strontium-doped neodymium chromite, calcium-doped neodymium chromite, strontium-doped yttrium ferrite, and calcium-doped yttrium ferrite.

16. The fuel cell power generation system of claim 14 wherein at least one of said bipolar interconnection plates in said fuel cell power generation system is attached to said anode member of one of said fuel cell units by a metallic brazing alloy secured therebetween, said metallic brazing alloy having a melting point greater than about 1200° C.

17. A stacked, multiple fuel cell power generation system comprising:

a plurality of individual fuel cell units, each fuel cell unit comprising an anode member, said anode member being comprised of elemental Ni and zirconia, a cathode member comprised of lanthanum manganite, and a portion of electrolyte material comprised of zirconia positioned between said anode member and said cathode member; and a plurality of bipolar interconnection plates, one of said plates being positioned between each of said fuel cell units in said power generation system in order to separate said fuel cell units from each other, each of said plates comprising a first side and a second side, said first side comprising a plurality of elongate gas flow channels therein, all of said gas flow channels being parallel to each other and extending longitudinally in a first direction, said second side comprising a plurality of elongate fuel flow channels therein, all of said fuel flow channels being parallel to each other and extending longitudinally in a second direction, said second direction being perpendicular to said first direction, each of said plates being comprised of about 40–80% by weight of a catalytic intermetallic compound capable of catalyzing steam reforming of hydrocarbon fuel compositions into hydrogen, carbon monoxide, and carbon dioxide during operation of said fuel cell power generation system, said intermetallic compound being selected from the group consisting of NiAl and $Ni_3Al$, each of said plates further comprising about 20–60% by weight of a ceramic filler composition randomly dispersed therein in order to form a porous plate structure having a lower coefficient of thermal expansion compared with plate structures comprised of said intermetallic compound which lack said ceramic filler composition, said ceramic filler composition being selected from the group consisting of zirconia, zirconium silicate, mullite, alumina, calcium zirconium phosphate, strontium zirconium phosphate, and cordierite, said first side of each of said interconnection plates comprising an electrically conductive protective coating thereon, said protective coating being selected from the group consisting of strontium-doped lanthanum chromite, calcium-doped lanthanum chromite, strontium-doped lanthanum cobaltite, calcium-doped lanthanum cobaltite, strontium-doped gadolinium cobaltite, calcium-doped gadolinium cobaltite, strontium-doped yttrium chromite, calcium-doped yttrium chromite, strontium-doped neodymium chromite, calcium-doped neodymium chromite, strontium-doped yttrium ferrite, and calcium-doped yttrium ferrite, at least one of said bipolar interconnection plates in said fuel cell power generation system being attached to said anode member of one of said fuel cell units by a metallic brazing alloy secured therebetween, said metallic brazing alloy having a melting point greater than about 1200° C.

18. A method for producing a bipolar interconnection plate for use in a fuel cell power generation system comprising the steps of:

combining elemental Al powder, elemental Ni powder, and at least one ceramic filler powder in order to form a mixture, said elemental Al powder and said elemental Ni powder being present in said mixture in an Al:Ni molar ratio of about 1:1;

compressing said mixture to form a compressed product; and heating said compressed product to a temperature of about 600°–1000° C. in order to cause said compressed product to solidify and produce said bipolar interconnection plate, said heating causing said elemental Al powder and said elemental Ni powder to form a metallic matrix within said plate comprised of intermetallic NiAl having said ceramic filler powder randomly dispersed therein.

19. The method of claim 18 wherein said mixture comprises about 25–75% by weight said ceramic filler powder.

20. The method of claim 18 wherein said ceramic filler powder is selected from the group consisting of zirconia, zirconium silicate, mullite, alumina, calcium zirconium phosphate, strontium zirconium phosphate, and cordierite.

21. The method of claim 18 wherein said compressing of said mixture comprises applying pressure to said mixture in an amount equal to about 10,000–30,000 psi.

22. The method of claim 18 further comprising the step of applying an electrically conductive protective coating to at least a portion of said bipolar interconnection plate.

23. A method for producing a bipolar interconnection plate for use in a fuel cell power generation system comprising the steps of:

combining elemental Al powder, elemental Ni powder, and at least one ceramic filler powder in order to form a mixture, said elemental Al powder and said elemental Ni powder being present in said mixture in an Al:Ni molar ratio of about 1:1;

compressing said mixture to form a compressed product;

heating said compressed product to a temperature of about 600°–1000° C. in order to cause said compressed product to solidify and produce said bipolar interconnection plate, said heating causing said elemental Al powder and said elemental Ni powder to form a metallic matrix within said plate comprised of intermetallic NiAl having said ceramic filler powder randomly dispersed therein; and applying an electrically conductive protective coating to at least a portion of said bipolar interconnection plate, said protective coating being applied to said portion of said plate by liquid injection plasma deposition.

24. A method for producing a bipolar interconnection plate for use in a fuel cell power generation system comprising the steps of:

combining elemental Al powder, elemental Ni powder, and at least one ceramic filler powder in order to form a mixture, said elemental Al powder and said elemental Ni powder being present in said mixture in an Al:Ni molar ratio of about 1:3;

compressing said mixture to form a compressed product; and heating said compressed product to a temperature of about 600°–1000° C. in order to cause said compressed product to solidify and produce said bipolar interconnection plate, said heating causing said elemental Al powder and said elemental Ni powder to form a metallic matrix within said plate comprised of intermetallic $Ni_3Al$ having said ceramic filler powder randomly dispersed therein.

25. The method of claim 24 wherein said mixture comprises about 25.0–75.0% by weight said ceramic filler powder.

26. The method of claim 24 wherein said ceramic filler powder is selected from the group consisting of zirconia, zirconium silicate, mullite, alumina, calcium zirconium phosphate, strontium zirconium phosphate, and cordierite.

27. The method of claim 24 wherein said compressing of said mixture comprises applying pressure to said mixture in an amount equal to about 10,000–30,000 psi.

28. The method of claim 24 further comprising the step of applying an electrically conductive protective coating to at least a portion of said bipolar interconnection plate.

29. A method for producing a bipolar interconnection plate for use in a fuel cell power generation system comprising the steps of:

combining elemental Al powder, elemental Ni powder, and at least one ceramic filler powder in order to form a mixture, said elemental Al powder and said elemental Ni powder being present in said mixture in an Al:Ni molar ratio of about 1:3;

compressing said mixture to form a compressed product;

heating said compressed product to a temperature of about 600°–1000° C. in order to cause said compressed product to solidify and produce said bipolar interconnection plate, said heating causing said elemental Al powder and said elemental Ni powder to form a metallic matrix within said plate comprised of intermetallic $Ni_3Al$ having said ceramic filler powder randomly dispersed therein; and applying an electrically conductive protective coating to at least a portion of said bipolar interconnection plate, said protective coating being applied to said portion of said plate by liquid injection plasma deposition.

* * * * *